(12) United States Patent
Abuali et al.

(10) Patent No.: US 6,310,660 B1
(45) Date of Patent: Oct. 30, 2001

(54) VIDEO SIGNAL DROPOUT DETECTOR

(75) Inventors: Khaled Amin Abuali, North Bergen; Donato Yazurlo, Hewitt, both of NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/040,684

(22) Filed: Mar. 18, 1998

(51) Int. Cl.[7] .......................... H01N 9/475; H01N 17/00
(52) U.S. Cl. ..................... 348/616; 348/615; 348/617; 348/618; 386/2; 386/46; 386/47; 386/50
(58) Field of Search ..................... 386/2, 46, 47, 386/48, 49, 50; 348/616, 615, 617, 618, 518, 192, 473; 360/31; 455/2; H04N 9/475, 17/00

(56) References Cited

U.S. PATENT DOCUMENTS

| 3,798,364 | 3/1974 | Hayashi | 386/48 |
| 4,287,529 | 9/1981 | Tatami et al. | 386/61 |
| 4,345,272 | 8/1982 | Shirota | 348/617 |
| 4,376,290 | 3/1983 | Shirota | 386/2 |
| 4,651,230 | 3/1987 | Hagita et al. | 386/2 |
| 4,689,695 | 8/1987 | Urata | 386/3 |
| 4,805,040 | * 2/1989 | Oku et al. | 386/85 |
| 5,060,056 | * 10/1991 | Miki et al. | 348/617 |
| 5,109,285 | * 4/1992 | Koga | 386/89 |
| 5,126,835 | 6/1992 | Wilkinson | 348/617 |
| 5,166,794 | * 11/1992 | Tanaka | 348/616 |
| 5,241,398 | 8/1993 | Urata et al. | 386/47 |
| 5,280,396 | * 1/1994 | Hamaguchi | 348/525 |
| 5,315,396 | * 5/1994 | Miyadera | 348/792 |
| 5,319,453 | * 6/1994 | Copriviza | 348/473 |
| 5,469,306 | 11/1995 | Hara | 701/208 |
| 5,471,250 | * 11/1995 | Otaki et al. | 348/498 |
| 5,495,294 | * 2/1996 | Evans | 348/542 |
| 5,530,483 | * 6/1996 | Cooper | 348/192 |
| 5,608,531 | * 3/1997 | Honda et al. | 386/1 |
| 5,696,866 | * 12/1997 | Iggulden et al. | 386/46 |
| 5,845,039 | * 12/1998 | Ko | 348/427 |

* cited by examiner

Primary Examiner—Mark R. Powell
Assistant Examiner—Wesner Sajous

(57) ABSTRACT

A method and apparatus for detecting video signal dropout. The method includes the step of generating a video signal, and then electronically isolating at least one component of the video signal. The at least one component is representative of the absence of the video signal itself. Next, the absence of the at least one component is electronically sensed. The step of electronically isolating can include the step of passing the video signal through a comb filter, and in particular isolating a luminescence signal from the video signal. The step of electronically isolating can also include passing the video signal through a sync separator. The step of electronically sensing can include passing the at least one component through a comparator. The method can also include the step of generating the video signal for a predetermined time duration, and simultaneously generating an audio signal to indicate the end of the predetermined time duration. In this embodiment, the step of electronically sensing is then terminated in response to the audio signal.

21 Claims, 7 Drawing Sheets

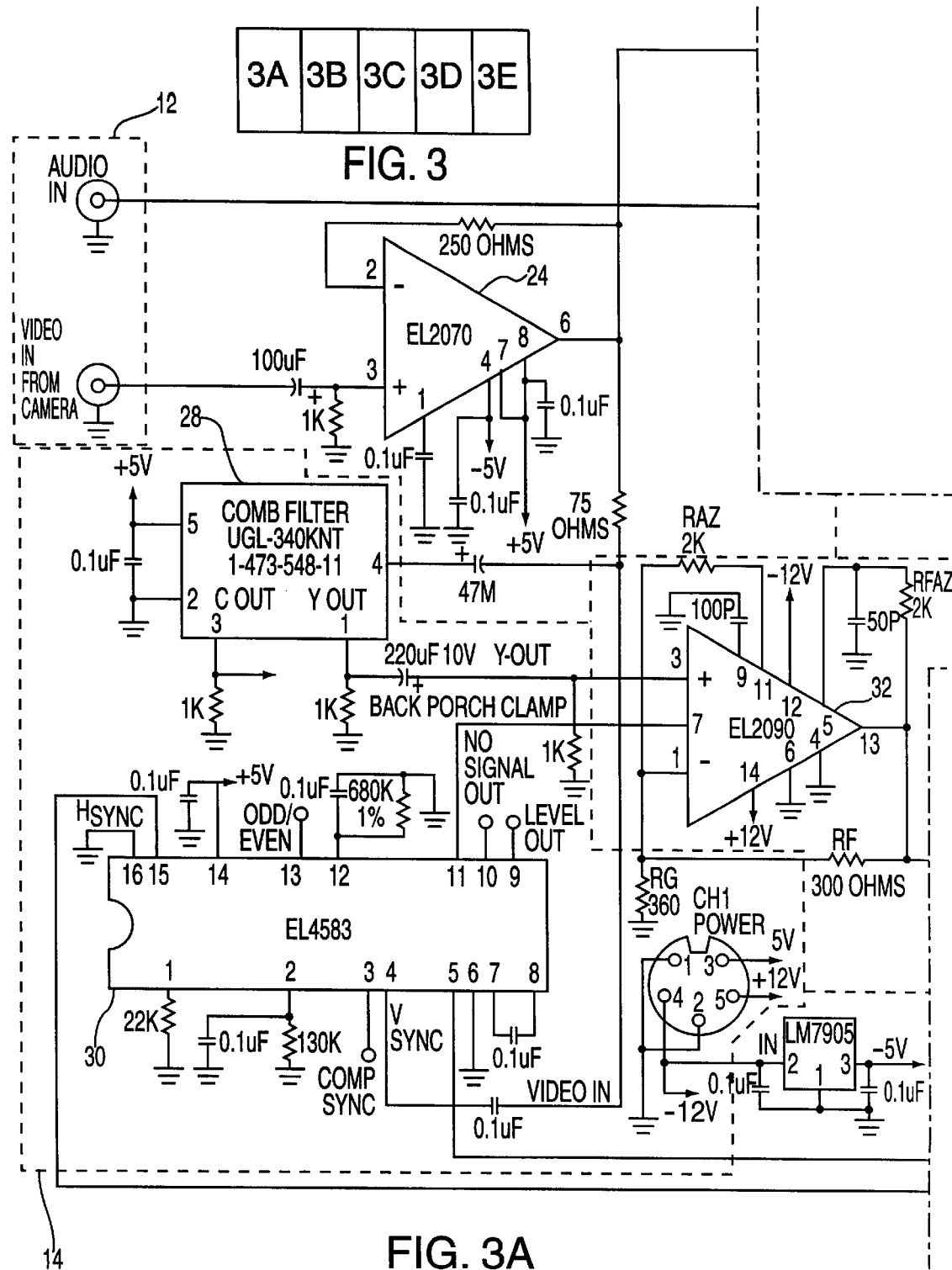

VIDEO SIGNAL DROPOUT DETECTOR

FIELD OF THE INVENTION

The invention relates generally to video signal monitoring and detection. In particular, the invention relates to an electronic video signal dropout detector for consumer video equipment such as video tape players.

BACKGROUND

Video equipment, such as video cassette recorder/players ("VCR") and camcorders, have become so popular as to be nearly ubiquitous. The vast number of consumers owning and operating such equipment has naturally increased the need for servicing and repairing such equipment, thus putting inordinate demands on qualified service technicians. Accordingly, a technician's time in diagnosing and correcting reported problems with video equipment is extremely valuable.

Among the more common video equipment problems reported by consumers, and resulting in the return of such equipment to the manufacturer, is video signal dropout. Video signal dropout is a usually momentary loss or interruption in the video signal emanating from the equipment, and may manifest itself on a video monitor as glitches or instantaneous blackout of the transmitted image.

Since video signal dropout is usually intermittent, technicians are frequently unable to detect and correct the problem. Furthermore, from a practical standpoint, the technician is simply unable to devote the time necessary to manually test each unit. Manual testing requires the technician to watch a video monitor for an extended period of time in hopes of seeing evidence of signal dropout, a procedure that the demands of production schedules clearly prohibit.

It can be seen from the foregoing that the need exists for a video dropout detector that will reliably identify the occurrence and frequency of occurrence of video signal dropout without requiring the constant presence or attention of a technician.

SUMMARY

One embodiment of the present invention provides a method of detecting video signal dropout. The method includes the step of receiving a video signal, and electronically isolating at least one component of the video signal. The at least one component is representative of the absence of the video signal itself. The absence of the at least one component is electronically sensed as an indication of dropout. In the preferred embodiment, the determination of the absence of the at least one component is determined by comparing the signal to an upper and a lower threshold to establish the presence or absence of the signal within a window of values.

The step of electronically isolating can include the step of passing the video signal through a comb filter, and in particular isolating a luminescence signal from the video signal. The step of electronically isolating can also include passing the video signal through a sync separator. The step of electronically sensing can include passing the at least one component through a comparator.

The method can also include the step of generating an audio signal to indicate the end of the predetermined time duration. In this embodiment, the step of electronically sensing is then terminated in response to the audio signal. The audio signal may be provided as part of a test tape.

A video signal dropout detector is also described. The detector is adapted to be connected to a video signal source, and includes an isolation assembly, connected to the video signal source, for isolating at least one signal component from a video signal generated by the video signal source. A sensing device is connected to the isolation assembly, and is equipped to sense an interruption in the at least one signal component. The at least one signal component is selected such that an interruption in the at least one signal component corresponds to a dropout of the video signal generated by the video signal source. The video signal may be provided by a test tape.

The isolation assembly can include a comb filter, and the at least one signal component can be isolated by passing the video signal through the comb filter. The comb filter can be used to isolate a luminescence component of the video signal. The isolation assembly can also include a video sync separator. The sensing device can include a comparator. A microcontroller can be connected to the sensing device and the destination device.

A test tape having a test pattern, such as an all green raster, is preferably used in conducting the test. The test tape includes audio signals used to indicate the beginning and end of the test.

The features of the invention believed to be patentable are set forth with particularity in the appended claims. The invention itself, however, both as to organization and method of operation, together with further objects and advantages thereof, may be best understood by reference to the following description taken in conjunction with the accompanying drawings.

DETAILED DESCRIPTION OF THE INVENTION

Figure 1:
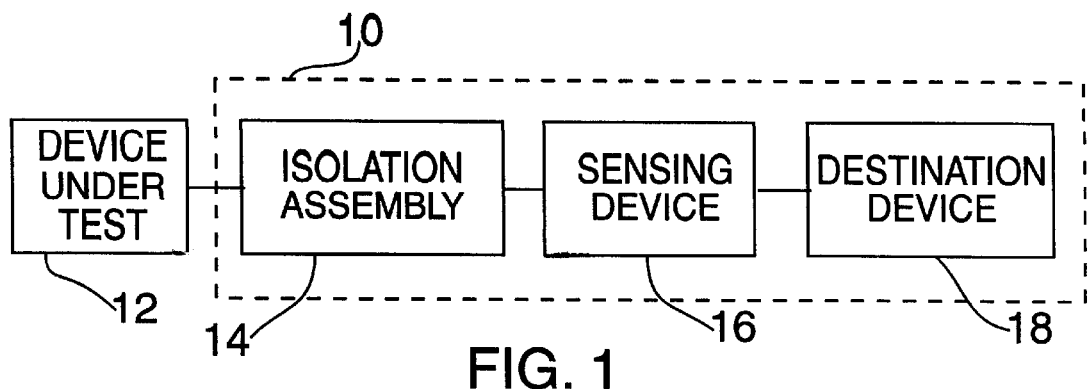
FIG. 1 illustrates a block diagram of a video signal dropout detector.

While this invention is susceptible of embodiment in many different forms, there is shown in the drawings, and will herein be described in detail, exemplary embodiments, with the understanding that the present disclosure is to be considered as illustrative of the principles of the invention and not intended to limit the invention to the exemplary embodiments shown and described.

Turning now to FIG. 1, a video signal dropout detector 10 is shown in block diagram. The detector 10 is adapted for connection to a device under test 12 which is a source of video and audio signals which may, for example, be a VCR, camcorder, or other piece of video equipment. Signals from the source 12 are transmitted to an isolation assembly 14. The isolation assembly 14 is used to isolate at least one signal component from a video signal generated by the video signal source 12, as will be described in greater detail with reference to FIG. 2. The at least one signal component is selected such that an interruption in the at least one signal component corresponds to a dropout of the video signal generated by the video signal source. The signal component from the isolation assembly 14 is then transmitted to a sensing device 16. The sensing device 16 is equipped to sense an interruption in the at least one signal component, as will be described in greater detail with reference to FIG. 2. Signals from the sensing device 16 are then transmitted to a detector output destination device 18, which can be provided to store, process, or display the output of the sensing device.

Figure 2:
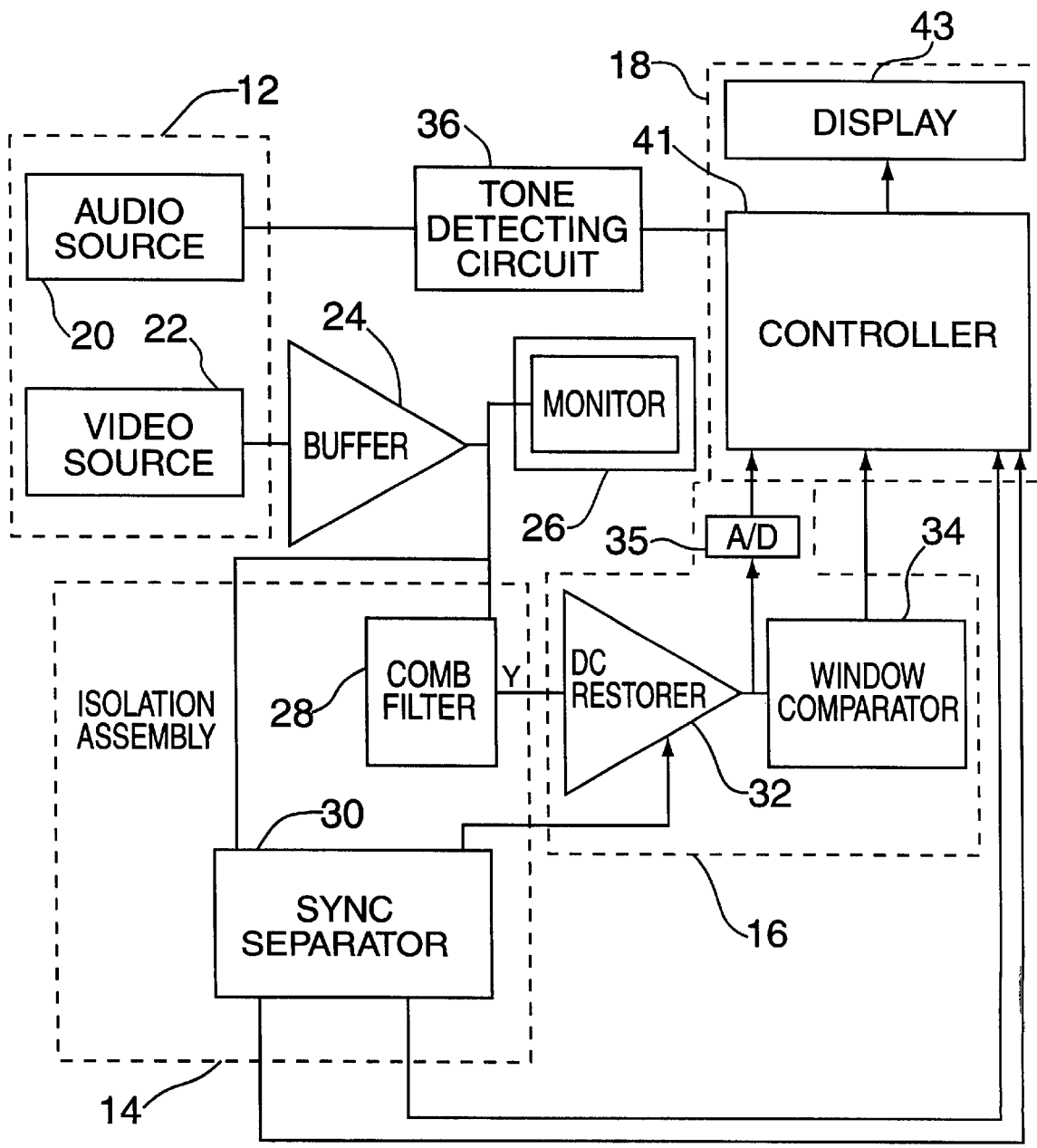
FIG. 2 illustrates a lower level block diagram of a video signal dropout detector.
Figure 3B:
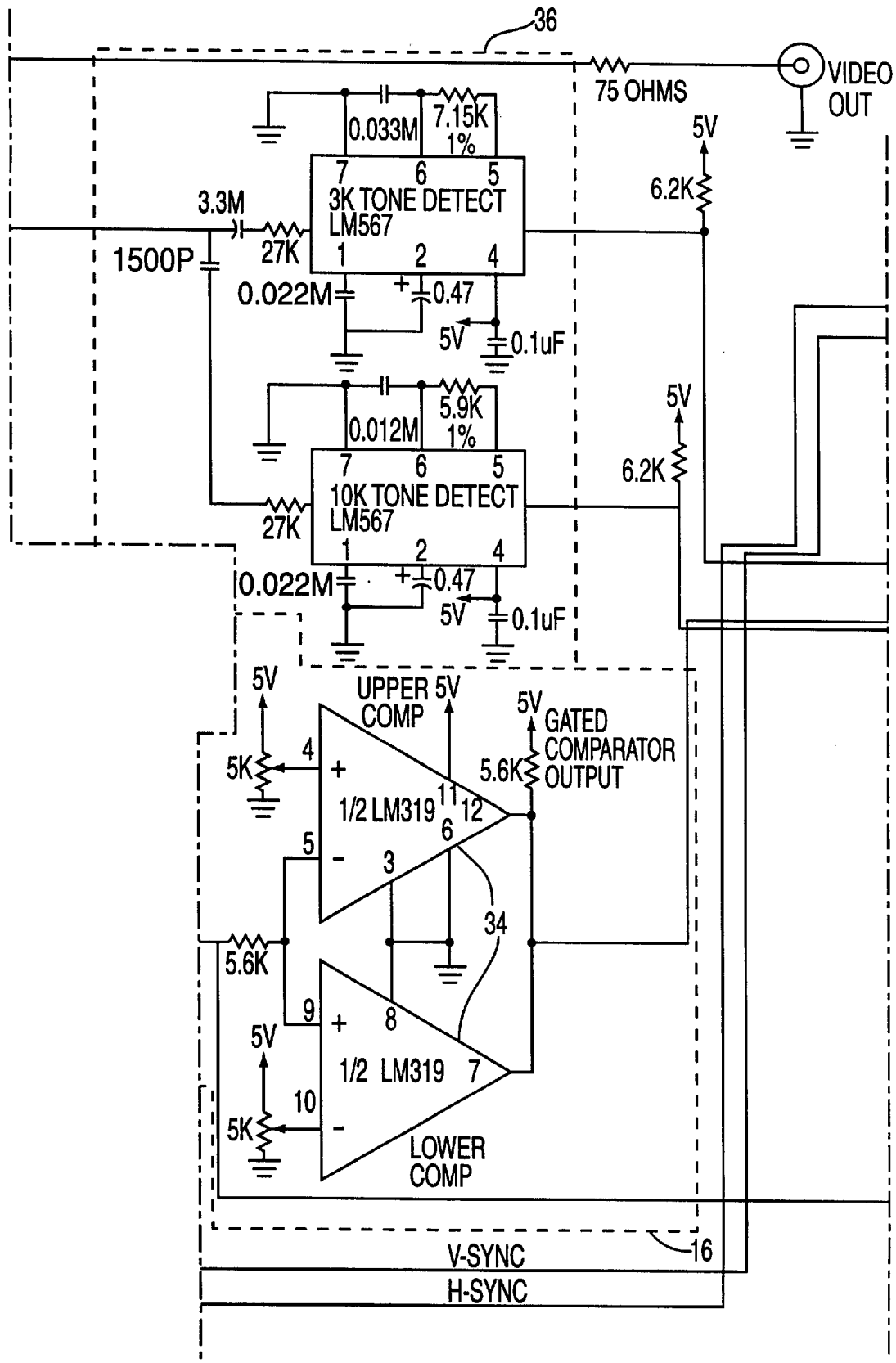
FIG. 3, shows the layout of FIG. 3A through FIG. 3E, which is an electrical schematic of an embodiment of a video signal dropout detector.
Figure 3C:
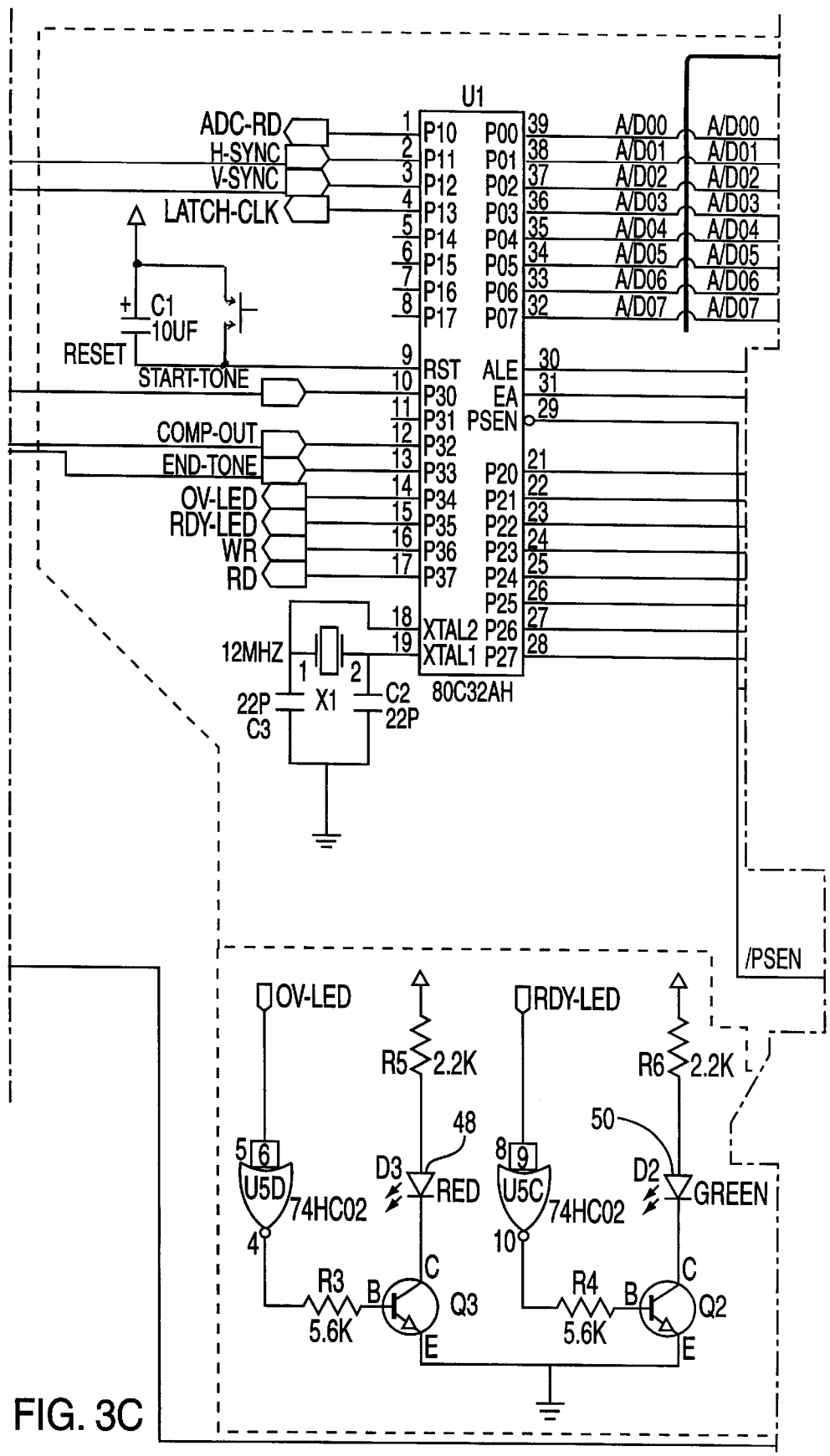
Figure 3D:
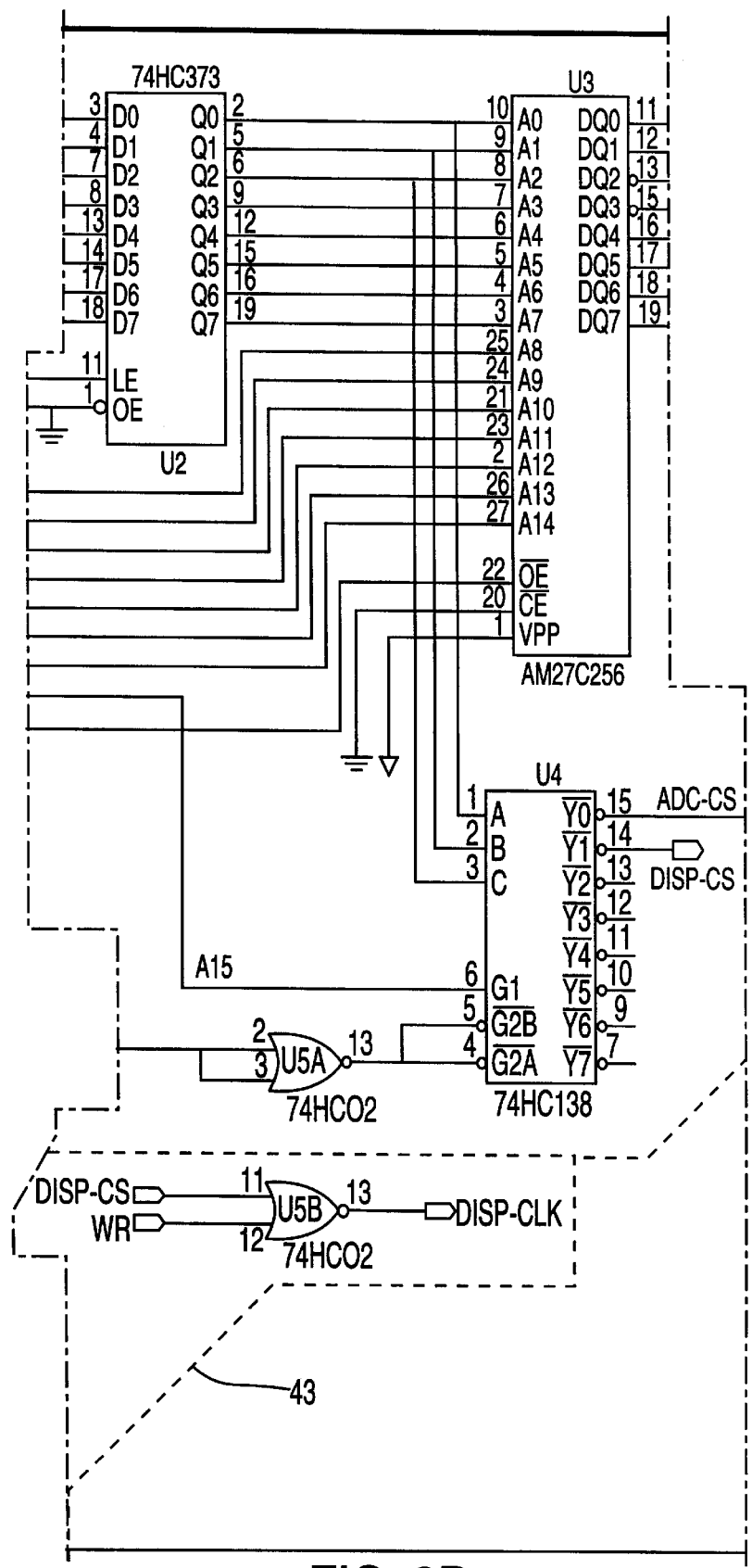
Figure 3E:
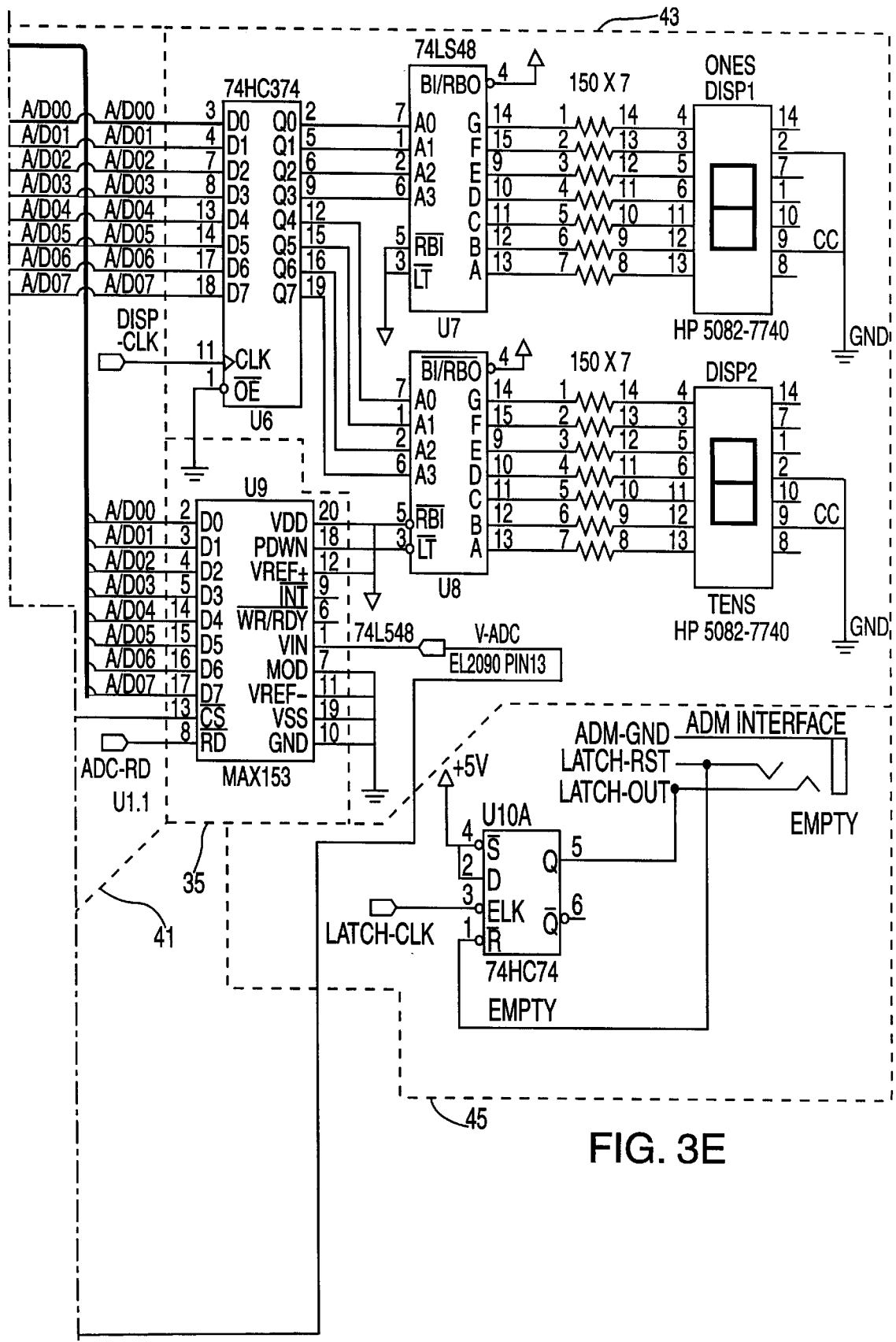

An embodiment of video signal dropout detector 10 is shown in greater detail in FIG. 2. The signal source 12 includes an audio source 20 and a video source 22. In the preferred embodiment, a test tape is utilized which provides predetermined audio signals used to signal the beginning and end of the test as well as video test signals. Preferably, the video test signal is a green raster which provides for high levels of luminance. Video signals from the video source 22 are transmitted to a buffer amp 24, and then to a video monitor 26 and to the isolation assembly 14. Display on the video monitor 26 may be used by the technician during operational setup of the detector 10, e.g., to ensure that the source is transmitting signal.

The isolation assembly 14 includes a comb filter 28, which separates the incoming video signal into "Y" (luminescence) and "C" (chromescence) components. Since the Y component is a more reliable indicator of the presence or absence of signal, the C component is stripped out, and the Y component is sent along to the sensing device 16 through a DC restorer 32. In other embodiments, other video components could be used.

The isolation assembly 14 also includes a sync separator 30, which is used to isolate the vertical and horizontal synchronization components of the incoming video signal.

In the sensing device 16, the output of the DC restorer 32, which provides a fixed DC reference value, is transmitted to a window comparator 34 and/or A/D connector 35. The window comparator 34 compares the input from the DC restorer to a reference value to determine whether dropout has occurred.

Output from the sensing device 16 is sent to a detector output destination device 18, which may include display 39 and microcontroller 41. In various embodiments contemplated, the detector output destination device 18 may be provided as a data storage, retrieval, and display device, for example, as a microcontroller and microcontroller interface, or a logic interface and PC with monitor and printer. Those of skill in the art will recognize that a number of variations is possible, depending upon the analytical needs of the user, the type of equipment, and other variables.

Output from the audio source 20 is transmitted to a tone detecting circuit 36. Output from the circuit 36 can be used to transmit a "start of tape" signal to indicate the beginning of a test as well as an "end-of-tape" signal, which can be programmed to terminate a test period for the detector 10.

FIG. 3 illustrates the layout of FIG. 3A through 3E to produce an electrical schematic representing a particular embodiment of the video signal dropout detector described hereinabove. Components previously described in general terms have been given reference numbers corresponding to those previously assigned, with their particular connections set forth in a manner that will be immediately appreciated by those of skill in the art.

In particular, the buffer amp 24 may be provided as an Elantec EL2070 current feedback amplifier. The comb filter 28 can be provided as Comb Filter part No. 1-473-548-11 available from Sony Corporation, 1 Sony Drive, Park Ridge, N.J. 07656. A suitable sync separator 30 is the Elantec EL4583C as shown or an industry standard LM1881. The Elantec EL2090C DC-restored video amplifier is suitable for the DC restorer 32. One appropriate comparator 34 is the LM319 high speed dual comparator manufactured by National Semiconductor Corporation configured as a window comparator to compare the incoming signal to upper and lower thresholds. If the signal is not within the upper and lower thresholds, a dropout is deemed to have occurred. The tone decoder 36 can be provided as a National Semiconductor LM567C tone decoder. The controller 41 may be based, for example, on an industry standard 80C32AH microcontroller, as illustrated in FIG. B, with associated peripheral logic and memory. Controller 41 may count the number of dropouts detected by comparator 34 (or detects dropouts in digital data from A/D 35) and provide the count to display 43. Alternatively, hard wired logic counters can be used to count the number of dropouts.

Display 43 may be implemented utilizing appropriate light emitting diodes or liquid crystal displays, such as Hewlett Packard HP 5082-7740 displays with suitable display drivers which can display a dropout count of up to 99. Also contemplated are single light emitting diodes 48 and 50. Diode 48 is used in the current embodiment to designate an overflow of over 99 dropouts. Diode 50 is used to display a system ready indication. A computer interface 45 is also contemplated which permits omission of display 43 in favor of a computer's video monitor as a display mechanism utilizing a suitable graphic user interface or other suitable interface.

Figure 4:
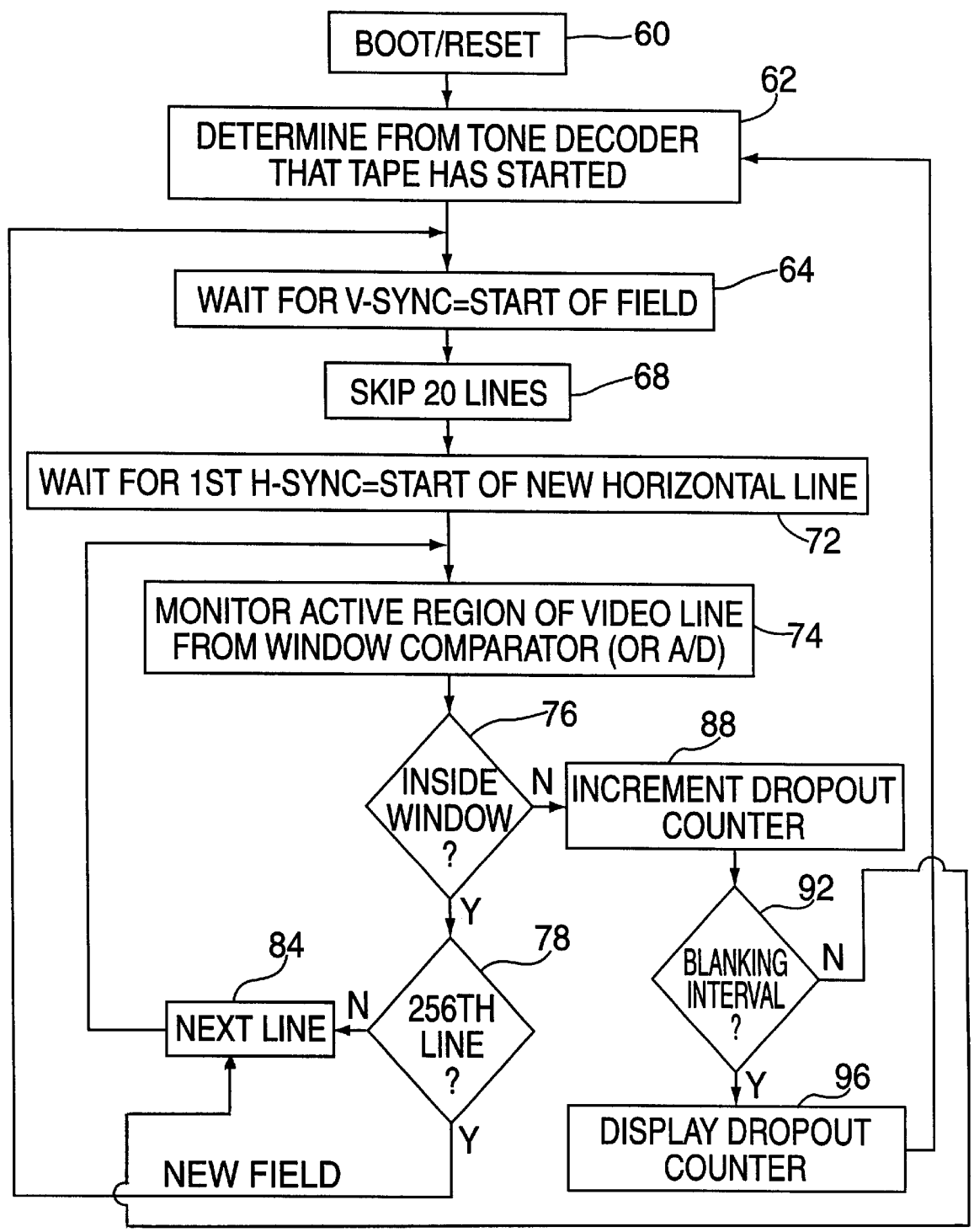
FIG. 4 is a flow chart describing the operation of an embodiment of the controller of the present invention.

Referring now to FIG. 4, a flow chart describing the operation of the present invention in terms of the controller operation is shown. At step 60, the controller boots up or is reset, thus initializing counters, etc. At step 62, the controller determines from the tone decoder 36 that a tape has started. At step 64, the system waits for the first vertical synchronization pulse indicating a start of a video field. Twenty lines are skipped at 68, in anticipation of receipt of the first horizontal sync pulse at step 72. The receipt of the first horizontal sync pulse at step 72 indicates the start of a new horizontal line.

At step 74, the active region of the horizontal video line is monitored in the form of the output of the window comparator 34, or alternatively, from an analog to digital converter 35 in order to determine if a dropout has occurred. At 76, if the signal falls within the boundaries established by the window comparator, it is determined that no dropout has occurred and the process proceeds to step 78. Step 78 determines whether or not the $256^{th}$ the line in the field has been reached. If not, the process proceeds to step 84, where the next line is incremented and the process returns to step 74. If, however, the $256^{th}$ line has been reached at step 78, the end of the current field has been reached and the process proceeds to step 64 to await the beginning of the next field.

At step 76, if the comparator indicates that the window boundaries have been exceeded, a determination that a dropout has occurred is established. The process then proceeds to step 88, where a dropout counter is incremented to count the number of dropouts. The process then proceeds to step 92. At step 92, the controller is awaiting the next blanking interval in order to update the display of the incremented dropout count at step 96. If it is not currently a blanking interval at 92, control returns to step 84. After updating the display dropout counter at 96, control returns to step 62 for as long as the user desires to monitor dropouts.

It is to be emphasized that the value, arrangement, and selection of components shown in FIG. 3 provide an exemplary embodiment of the principles discussed herein, and are not intended to be limiting. For example, the output of the DC restorer 32 could be fed through A/D converter 35 for digital processing rather than using analog comparator 34.

It is also contemplated that other variations will be apparent upon reference to the instant description. For example, it is contemplated that AGC circuitry could be provided in conjunction with a suitable control device, so that known particular equipment and videotape characteristics could be anticipated and taken into consideration. Further, the detector could be used as a stand-alone unit, or as part of a so-called "burn rack" for overnight testing.

Thus it is apparent that in accordance with the present invention, an apparatus that fully satisfies the objectives, aims, and advantages achievable in accordance with the principles of the present invention is set forth in the above exemplary embodiments. While the invention has been described in conjunction with these exemplary embodiments, it is evident that many alternatives, modifications, permutations, and variations will become apparent to those skilled in the art in light of the foregoing description. Accordingly, it is intended that all such alternatives, modifications, permutations, and variations to the exemplary embodiments can be made without departing from the scope and spirit of the present invention.

What is claimed is:

1. A method of detecting video signal dropout, the method comprising the steps of:
    receiving a video signal;
    isolating at least one component of the video signal, the at least one component being representative of the absence of the video signal itself;
    sensing the absence of the at least one components;
    counting the number of times that a dropout occurs to produce a dropout count; and
    displaying said dropout count.

2. A method according to claim 1, wherein the step of isolating comprises electronically isolating by passing the video signal through a comb filter.

3. A method according to claim 2, wherein the step of isolating comprises electronically isolating a luminescence signal from the video signal.

4. A method according to claim 1, wherein the step of isolating comprises electronically isolating by passing the video signal through a sync separator.

5. A method according to claim 1, wherein the step of sensing further comprises comparing said at least one component with a threshold value.

6. A method of detecting video signal dropout, the method comprising the steps of:
    receiving a video signal;
    isolating at least one component of the video signal, the at least one component being representative of the absence of the video signal itself;
    sensing the absence of the at least one component;
    generating the video signal for a predetermined time duration;
    generating an audio signal to indicate the end of the predetermined time duration; and
    terminating the step of sensing in response to the audio signal.

7. A method according to claim 6, further comprising the steps of counting the number of times that a dropout occurs to produce a dropout count and displaying said count.

8. A video signal dropout detector comprising:
    a video signal source;
    isolation means, connected to the video signal source, for isolating at least one signal component from a video signal generated by the video signal source;
    sensing means, connected to the isolation means, for sensing an interruption in the at least one signal component;
    counting means for counting a number of dropouts occurring within a test period; and
    display means for displaying said number of dropouts;
    wherein an interruption in the at least one signal component corresponds to a dropout of the video signal generated by the video signal source.

9. A video signal dropout detector comprising:
    a video signal source;
    isolation means, connected to the video signal source, for isolating at least one signal component from a video signal generated by the video signal source; and
    sensing means, connected to the isolation means, for sensing an interruption in the at least one signal component;
    wherein an interruption in the at least one signal component corresponds to a dropout of the video signal generated by the video signal source, wherein the isolation means includes a comb filter, wherein the at least one signal component is isolated by passing the video signal through the comb filter, and wherein the at least one signal component includes a luminescence component of the video signal.

10. A video signal dropout detector according to claim 8, wherein the isolation means includes video sync separator.

11. A video signal dropout detector according to claim 10, wherein the at least one signal component includes a sync output from said sync separator.

12. A video signal dropout detector according to claim 11, wherein the at least one signal component is back porch output from the sync separator.

13. A video signal dropout detector according to claim 8, wherein the sensing means includes a comparator.

14. A video signal dropout detector according to claim 13, wherein said comparator includes a window comparator.

15. A video signal dropout detector according to claim 8, further comprising a microcontroller connected to the sensing means.

16. A video dropout detector mechanism comprising the following:
    separation means for separating luminescence and synchronization components from a video signal,
    restorer means, electrically connected to the separation means, for restoring the luminescence and synchronization components of the video signal;
    comparator means, electrically connected to the restorer means, for comparing an output of the restorer means to a reference value;
    logic circuit connected to the comparator means; and
    a computer operatively connected to the logic circuit;
    whereby the computer includes a memory which saves the output from the comparator means.

17. A video signal dropout detector according to claim 16, wherein the separation means includes a video sync separator.

18. A video signal dropout detector according to claim 16, wherein the separation means includes a comb filter.

19. A video signal dropout detector according to claim 16, further comprising a microcontroller connected to the comparator means.

20. A video signal dropout detector according to claim 16, wherein said comparator means includes a window comparator.

21. A video signal dropout detector comprising:

a video tape player serving as a signal source by playback of a test tape;

said test tape including audio signals indicative of a test start and a test stop signal, and a video signal comprising a green raster;

isolation means, including a comb filter and a video sync separator, connected to the video signal source, for isolating a luminance signal component from a video signal generated by the video signal source; and sensing means, including a window comparator connected to the isolation means, for sensing an interruption in the at least one signal component by comparing said luminance signal with an upper threshold and a lower threshold;

wherein if said luminance signal is outside said upper and lower thresholds, a dropout of the video signal generated by the video signal source is deemed to have occurred;

counting means for counting a number of dropouts occurring between the occurrence of said start and stop signals within a test period; and display means for displaying said number of dropouts.

* * * * *